United States Patent [19]

Lamprecht, deceased et al.

[11] Patent Number: 4,847,841
[45] Date of Patent: Jul. 11, 1989

[54] MAGNETIC FIELD SOURCE FOR AN ION LASER

[75] Inventors: Herbert Lamprecht, deceased, late of Munich; by Thekla Lamprecht, heir; by Simon Lamprecht, Heir, both of Landsberg; Guenter Funk; Hans Krueger, both of Munich, all of Fed. Rep. of Germany

[73] Assignee: Siemens Aktiengesellschaft, Berlin and Munich, Fed. Rep. of Germany

[21] Appl. No.: 51,695

[22] Filed: May 20, 1987

[30] Foreign Application Priority Data

May 22, 1986 [DE] Fed. Rep. of Germany ....... 3617208

[51] Int. Cl.⁴ .............................................. H01S 3/03
[52] U.S. Cl. ....................................... 372/37; 372/34; 372/61
[58] Field of Search .......................... 372/37, 61, 34

[56] References Cited

U.S. PATENT DOCUMENTS

| | | | |
|---|---|---|---|
| 3,143,568 | 11/1938 | Gordon et al. | 331/94.5 |
| 3,514,714 | 5/1970 | Angelbeck | 372/37 |
| 3,521,193 | 7/1970 | Wingfield et al. | 372/37 |
| 3,522,551 | 8/1970 | Fendly | 331/94.5 |
| 4,035,741 | 6/1977 | Crisp et al. | 331/94.5 G |
| 4,475,199 | 10/1984 | Sanders et al. | 372/37 |
| 4,504,954 | 3/1985 | Güers et al. | 372/37 |
| 4,530,096 | 7/1985 | Bekefi et al. | 372/37 |
| 4,604,752 | 8/1986 | Sequin et al. | 372/37 |
| 4,644,548 | 2/1987 | Gold et al. | 372/37 |
| 4,715,039 | 12/1987 | Miller et al. | 372/37 |

FOREIGN PATENT DOCUMENTS 2026109 5/1970 Fed. Rep. of Germany.
1298748 5/1970 United Kingdom.

OTHER PUBLICATIONS

Belousova; "Characteristics of the ... Magnetic Fields"; Sov. J. Quant. Electron, vol. 4, No. 6, Dec. 1974; pp. 767-769.
Kobayashi; "Power Enhancement ... Magnetic Field"; Appl. Phys. Letter 46 (10), 15 May 1985; pp 925-927; class 372/37.
IBM Technical Disclosure Bulletin, vol. 22, No. 8A, Jan. 1980 Title: Multipole Containment of Laser Plasma.
Appl. Phys. Lett, 46 (10), May 15, 1985 publication by Kobayashi entitled: Power Enhancement for Argon II Narrow Tube Lasers by a Transverse Magnetic Field.
Appl. Phys. 4, 141 (1974), Publication by Banse, entitled: Der Einflub Axialer Magnetfelder auf den ArII--Hochleistungslaser.

Primary Examiner—William L. Sikes
Assistant Examiner—Xuan Thi Vo
Attorney, Agent, or Firm—Hill, Van Santen, Steadman & Simpson

[57] ABSTRACT

An ion laser includes a magnetic field source to generate an axial magnetic field in one region and transverse field components outside the region, the magnetic field source being shorter than the discharge channel of the laser. Axially spaced permanent magnets in the proximity of the discharge channel are adapted to the laser structure and can include magnetic rings or ring structures. The magnets are preferably adjacent the cathode end of the discharge channel.

14 Claims, 3 Drawing Sheets

4,847,841

MAGNETIC FIELD SOURCE FOR AN ION LASER

BACKGROUND OF THE INVENTION

1. Field of the Invention

The present invention relates generally to an ion laser having a magnetic field source to generate a magnetic field in the region of a discharge channel.

2. Description of the Related Art

An ion laser is known from the publication *Applied Physics* 4 (1974) pages 141-145. An improvement in the laser power is achieved therein by applying an axial magnetic field in the discharge channel.

In *Applied Physics Letters* 46 (10), 15 May 1985, pages 925-927, an increase by a factor of three in the laser power is achieved by applying a transverse magnetic field. The increase is accomplished by at least doubling the input power due to the increase in the excitation voltage which is simultaneously required. In addition, the required ignition voltage is increased by approximately a factor of three due to the axial magnetic field. Thus, there is a considerable additional expense for driving the laser.

SUMMARY OF THE INVENTION

An object of the present invention is to provide an increased laser power output without a significant increase in the excitation voltage or in the ignition voltage. In particular, the drive equipment hitherto employed for ion lasers is used herein.

An ion laser in accordance with the objects of the invention is achieved by a magnetic field source that does not extend over the entire length of the discharge channel, yet generates field components outside its length along the discharge channel. The claimed ion laser arrangement produces in the discharge channel a magnetic field that partially has an axial and a radial component. The yield of the laser emission is, thus, improved without the voltage at the discharge channel and the power consumption by the laser being noticeably increased. Thus, a more efficient ion laser is provided.

An especially simple design of the magnetic field source is possible since it is sufficient to arrange permanent magnets in the proximity of the discharge channel, the permanent magnets extending in the field direction of the discharge tube a smaller extent than the length of the discharge channel. The shape of the permanent magnets is adapted to the particular structure provided. Particularly for air-cooled ion lasers, one, two or more magnetic field sources are preferably provided, the magnetic field sources being formed by permanent magnets spaced at a distance from one another in an axial direction. For example, the permanent magnets are arranged at a suitable distance between two respective cooling plates for the laser.

Magnetic rings which surround the discharge channel are advantageously used to generate a highly pronounced axial magnetic field. A radial component of the magnetic field outside the rings can be set precisely by providing different size rings. The magnetic rings may be composed of magnets in the shape of ring sectors, to facilitate mounting of the magnetic rings and enable the rings to be subsequently introduced during assembly of the present ion laser. Such magnets can advantageously be secured to the cooling plates of the laser, such as for air cooled ion laser embodiments.

A particularly great increase in the light yield is achieved when the magnetic field source is disposed adjacent the cathode space, the magnetic field source preferably being in the form of a magnet or a magnetic ring. A relatively great space is usually available at this location so that the ring can be shaped to provide a magnetic field which penetrates the overall discharge channel with an approximately uniform strength. When, by contrast, magnetic rings having a small outside diameter are used, then a particularly easily manufacturable embodiment is provided since the magnets, or magnetic rings, are arranged only in the region of the two ends of the discharge channel.

When the discharge channel is accommodated in a rectangular ceramic rod, a greater number of small magnets is recommended for use. The magnets are arranged at the broad outside surface of the ceramic rod. In this embodiment, a well-defined magnetic field guidance is achieved without a noticeable deterioration of the heat dissipation.

The claimed invention is used with particular advantage in argon ion lasers and especially those argon ion lasers having laser powers in the milliwatt range.

DESCRIPTION OF THE PREFERRED EMBODIMENTS

Figure 1:
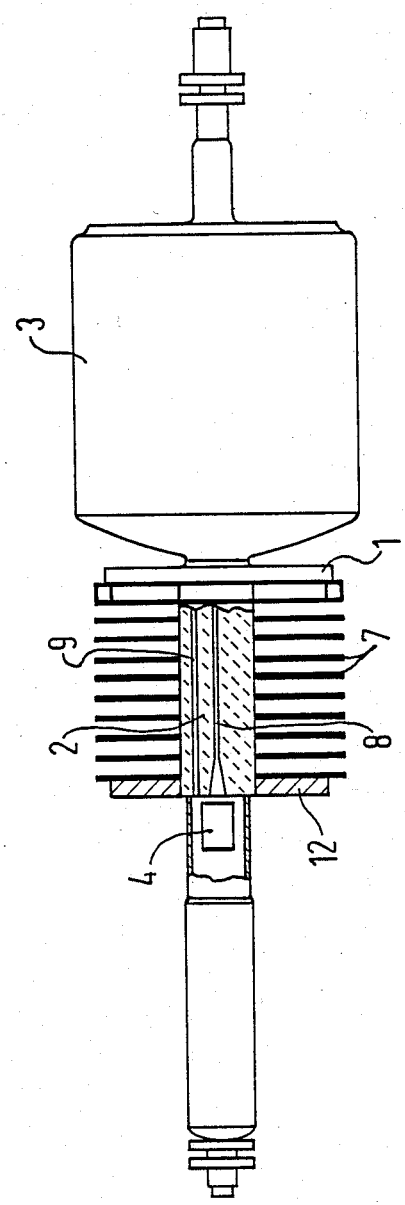
FIG. 1 is a side elevational view, in partial cross section, of an argon ion laser including a magnetic field source according to the principles of the present invention.

In FIG. 1, an argon ion laser includes a cathode region 3 fastened to a laser capillary and an annular permanent magnet 1 positioned next to the cathode region 3. The permanent magnet 1 is held mechanically fast to an adjacent cooling disk 7 that extends from the laser discharge tube 2. At the other end of the laser tube 2 is an anode 4 and a magnetic ring 12, also held fast to an adjacent cooling disk 7. In the illustrated example, an axial magnetic field is generated over a large portion of a discharge channel 8 extending along the tube 2. Radial or transverse components of the magnetic field are relatively small in the discharge channel 8 since the laser tube 2 is sufficiently large to contain at least one gas return channel 9 adjacent the discharge channel 8. The diameter of the laser tube 2 is, thus, relatively large in comparison to the diameter of the discharge channel 8.

In particular embodiments that have relatively shorter laser tubes 2, the magnetic ring 12 at the anode side is preferably omitted to provide a desirable component of radial or transverse field components, and to simultaneously reduce costs.

Figure 2:
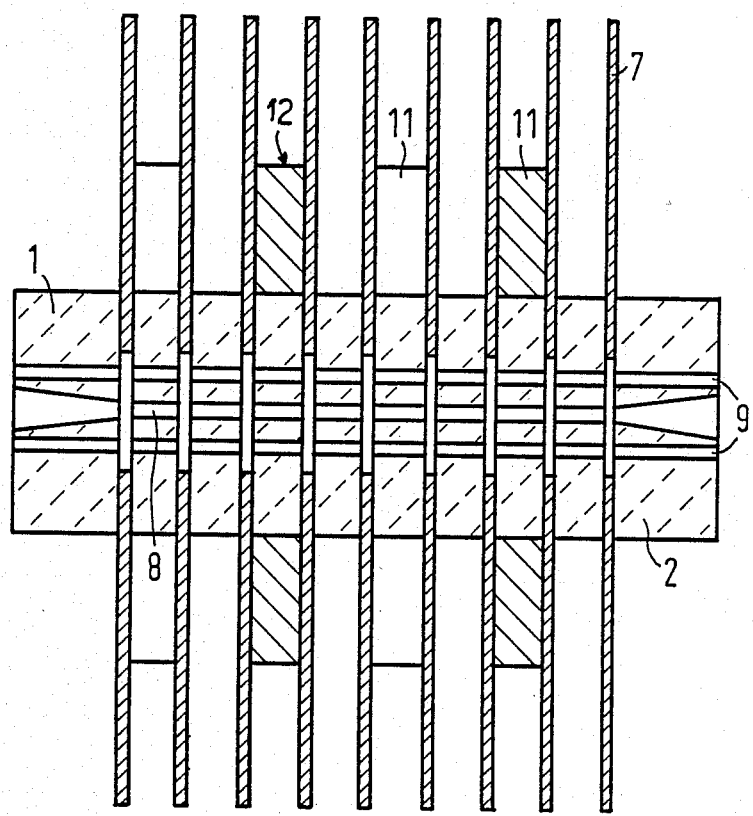
FIG. 2 is an enlarged cross section of a portion of the laser tube of the ion laser shown in FIG. 1, including magnetic field sources of the present invention.

In FIG. 2, magnetic rings 12 are disposed between the cooling plates 7 of the laser tube 2. The magnetic rings 12 are composed of at least two permanent magnet sections 11 having the shape of, i.e. segments of a ring annular sectors. Neighboring annular sectors 11 are arranged offset relative to one another in a circumferential direction. In the embodiment of FIG. 2, a curved field strength in the discharge channel 8 is set by different field strengths of the various magnet sections 11. Due to the greater number of magnets 11 than in the previously described embodiment, the diameters of the magnet sections 11 can be kept relatively small. As a result thereof, a major portion of the cooling surfaces of the cooling plates 7 is exposed and cooling efficiency is not deteriorated to a noticeable degree. Insofar as the manufacturing process allows it, magnetic rings of one piece can also be used in this embodiment.

Figure 3:
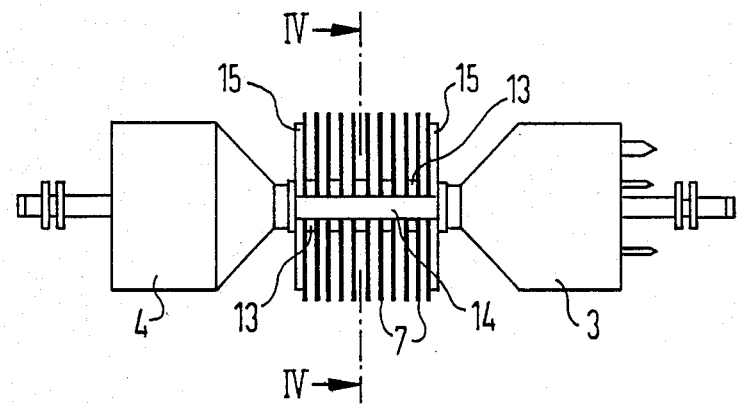
FIG. 3 is a side elevational view of an embodiment of an ion laser including a rectangular ceramic rod forming the laser tube.
Figure 4:
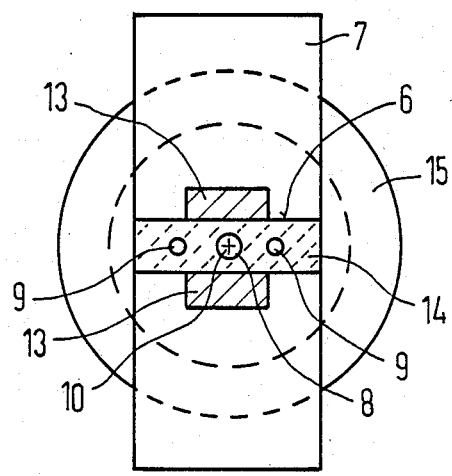
FIG. 4 is a cross section along line IV—IV of FIG. 3 showing the rectangular rod and the magnetic field sources of the present invention.

In an embodiment shown in FIGS. 3 and 4, individual magnets 13 are fastened onto a larger outside surface 6 of a rectangular ceramic rod 14. The ceramic rod 14 includes the discharge channel 8 extending along its axis of symmetry 10, as well as two axially extending gas return channels 9 disposed symmetrically on either side thereof. The individual magnets 13 have the form of simple cuboids and are relatively small. The magnets 13 contribute to reinforcing the ceramic rod 14 against bending stresses, particularly since the magnets 13 completely fill, in an axial direction, the spaces between adjacent ones of the cooling plates 7. Magnetic rings 15 are also attached at both ends of the discharge channel or ceramic rod 14.

The embodiment of FIGS. 3 and 4 provides a defined field guidance including transverse field components, since the magnetic rings 15 generate an axial magnetic field and the individual magnets 13 generate at least a partially transverse magnetic field.

The magnet arrangements of a preferred embodiment are of such size that they generate a field strength of approximately 700 Gauss at least at one location along the discharge channel.

Although other modifications and changes may be suggested by those skilled in the art, it is the intention of the inventors to embody within the patent warranted hereon all changes and modifications as reasonably and properly come within the scope of their contribution to the art.

We claim as our invention:

1. An improved ion laser having a gas discharge channel in a laser tube and including an anode and a cathode, the improvement comprising:
    a magnetic field source mounted to generate an axial magnetic field within a first subregion of said discharge channel, said first subregion being less than the entire length of said discharge channel and being distinct from a second subregion of said discharge channel, said magnetic field source being mounted to generate radial magnetic field components along said second subregion of said discharge channel.
2. An ion laser as claimed in claim 1, wherein said magnetic field source includes a permanent magnet having an extent in an axial direction of said discharge tube that is less than the length of said discharge tube.
3. An ion laser as claimed in claim 1, further comprising:
    at least two magnetic field sources formed by permanent magnets spaced apart from one another in an axial direction of said discharge channel.
4. An ion laser as claimed in claim 1, further comprising:
    magnetic rings disposed surrounding said discharge channel to form said magnetic field source.
5. An ion laser as claimed in claim 4, wherein said magnetic rings include permanent magnets in the shape of annular sectors.
6. An ion laser as claimed in claim 1, further comprising:
    cooling plates rigidly affixed to said laser tube,
    said magnetic field source being rigidly affixed to said cooling plates.
7. An ion laser as claimed in claim 1, wherein said magnetic field source is disposed adjacent a cathode region of said ion laser and provides axial and radial magnetic field components along said second subregion.
8. An ion laser as claimed in claim 7, further comprising:
    a second magnetic field source disposed at an anode side of said discharge channel.
9. An ion laser as claimed in claim 1, further comprising:
    a rectangular ceramic rod having said discharge channel extending along an axis of symmetry of said ceramic rod; and
    a plurality of relatively small individual magnets disposed at outside surfaces of said ceramic rod along said discharge channel.
10. An ion laser as claimed in claim 9, further comprising:
    magnetic rings affixed at opposite ends of said discharge channel, and
    said small individual magnets being at least partially magnetized to generate a transverse magnetic field extending perpendicular to said discharge channel.
11. An ion laser as claimed in claim 1, wherein said ion laser is an argon ion laser.
12. An ion laser as claimed in claim 11, wherein said magnetic field source generates a magnetic field having a strength of at least 700 Gauss at least at one location along said discharge channel.
13. An ion laser as claimed in claim 7, wherein said magnetic field source is at least one permanent magnet.
14. An ion laser as claimed in claim 7, further comprising:
    cooling fins in thermal contact with said laser tube, and
    said magnetic field source being affixed to said cooling fins.

* * * * *